Sept. 26, 1933.　　　　J. W. HAYWOOD　　　　1,928,452
CONTROLLER FOR VACUUM OPERATED DIRECTIONAL SIGNALS
Filed Feb. 5, 1931　　　2 Sheets-Sheet 1
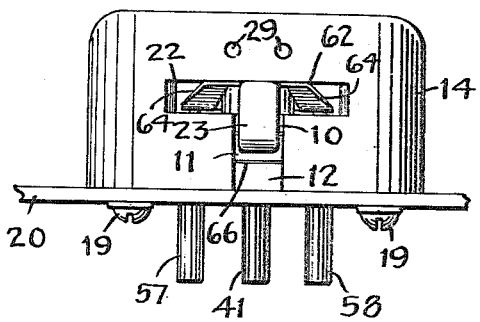
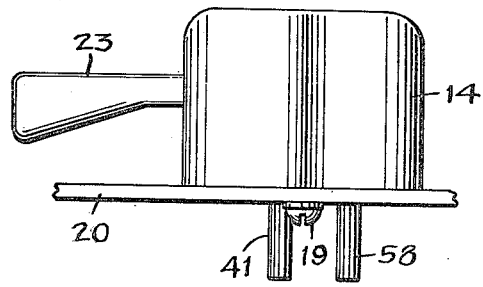
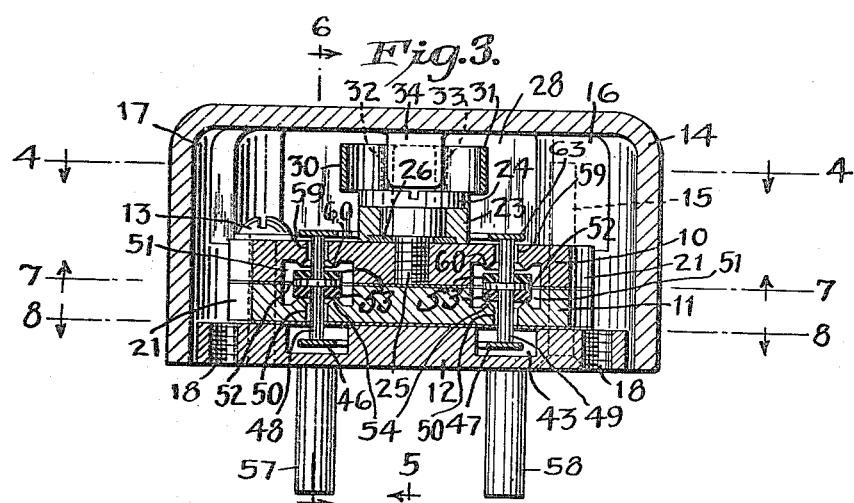
INVENTOR:
John W. Haywood
BY Chas. M. E. Chapman
ATTORNEY Sept. 26, 1933.  J. W. HAYWOOD  1,928,452
CONTROLLER FOR VACUUM OPERATED DIRECTIONAL SIGNALS
Filed Feb. 5, 1931  2 Sheets-Sheet 2
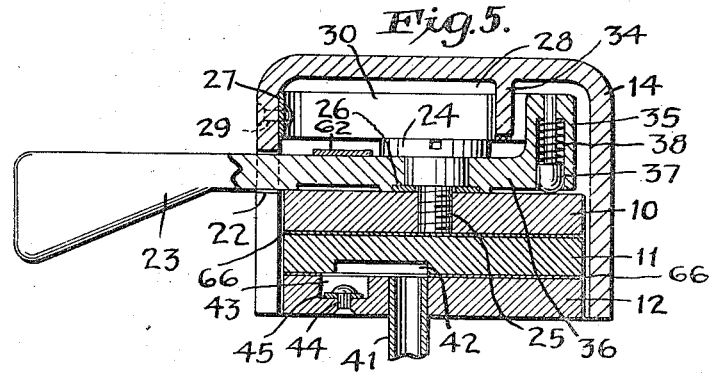
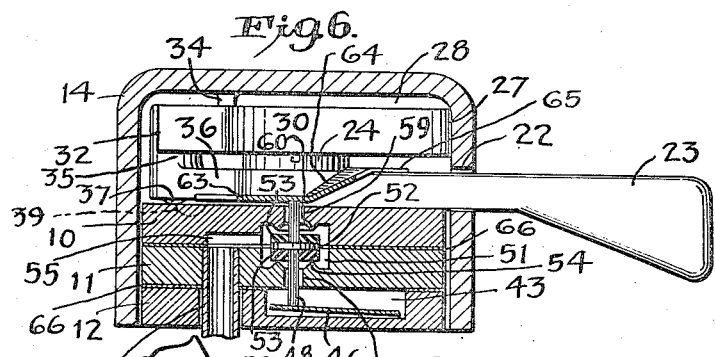
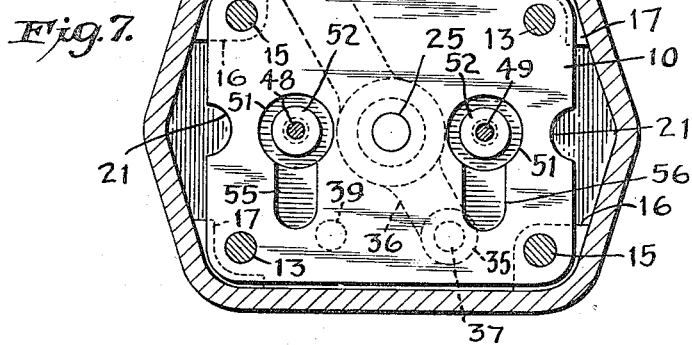
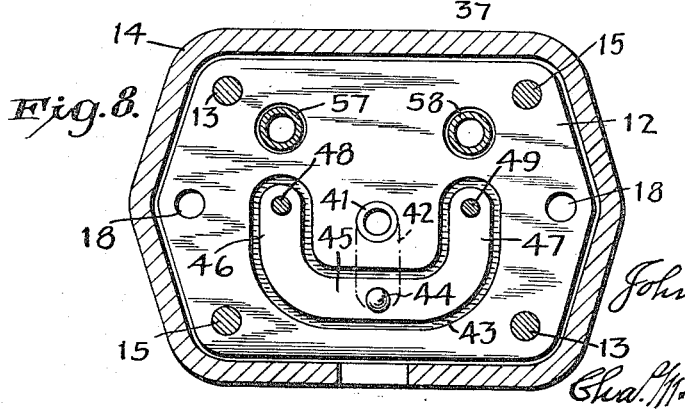
INVENTOR:
John W. Haywood
ATTORNEY:
Chas. M. C. Chapman Patented Sept. 26, 1933

1,928,452

UNITED STATES PATENT OFFICE 1,928,452

CONTROLLER FOR VACUUM OPERATED DIRECTIONAL SIGNALS

John W. Haywood, New York, N. Y., assignor to Thomas R. Brooks, Scranton, Pa.

Application February 5, 1931. Serial No. 513,561

7 Claims. (Cl. 277—3)

This invention relates to the art of directional signals for use on automobiles and similar road vehicles, and has particular reference to a controlling valve for regulating the operation of signals of the type which are actuated by the effects of vacuum.

Directional signals for road vehicles are placed on both sides thereof, and it is advantageous to have the valve controlling these signals so arranged that, when one of the signals is operated, it will remain in position until released. In many controlling valves for operating directional signals, it is necessary for the operator to hold his hand on the valve handle while the signal is elevated or functioning. This is a disadvantage, particularly in turning a corner with a heavy vehicle, as the operator needs both hands for controlling the vehicle. Moreover, the average controlling valve is complicated, expensive, gets out of order quickly, and is unsatisfactory for other reasons.

Among the objects of my invention may be noted the following: to provide a valve for controlling the operation of directional signals mounted on large vehicles such as busses and trucks, which requires a mere shifting of the controlling lever and no further attention to the valve or signal, so that the driver can give all his attention to the operation and control of his vehicle; to provide a valve which is simple in construction, effective in operation, and economical to construct since machined and expensive parts are eliminated; to so construct all the parts as to enable them to be rapidly and easily assembled and produce an accurate and efficient valve at low cost; and to provide a valve of the type noted which can be provided with means for mounting it on the vehicle in any place desired regardless of the type of vehicle.

With the above objects in view and others which will be detailed during the course of this description, my invention consists in the parts, features, elements and combinations thereof hereinafter described and claimed.

In order that my invention may be clearly understood, I have provided drawings wherein:

Figure 1 is a front elevational view;

Figure 2 is a side elevational view;

Figure 3 is a longitudinal sectional view taken on the line 3—3 of Figure 4 and looking in the direction of the arrows;

Figure 4 is a sectional plan view taken on the line 4—4 of Figure 3, looking in the direction of the arrows and with the parts in the neutral or off position;

Figure 5 is a cross sectional view taken on line 5—5 of Figure 4, looking in the direction of the arrows;

Figure 6 is a cross sectional view taken on the line 6—6 of Figure 3, looking in the direction of the arrows;

Figure 7 is a sectional plan view taken on line 7—7 of Figure 3, looking in the direction of the arrows, and the parts being in the position they would assume with one of the signals in operation; and Figure 8 is a sectional plan view taken on line 8—8 of Figure 3, and looking in the direction of the arrows.

Referring again to the drawings, the valve body comprises three plates 10, 11 and 12 secured together at opposite corners by screws 13. The plates are mounted in a valve casing or cover 14 and secured therein by screws 15 which pass through the plates and are threaded into bosses 16 formed in diametrically opposite corners of the cover 14. The bosses 16 and thickened portions 17 of the cover act as a means for accurately positioning the plates 10, 11 and 12 in the valve cover. The plates 10, 11 and 12 and the cover 14 may advantageously be formed of die-castings so as to eliminate machine work.

The contour of the plates 10 and 11 is similar. The outer plate 12 conforms, substantially, with the cover and is provided with a pair of threaded openings 18 which accommodate screws 19 for securing the valve in position on the vehicle, 20 representing the instrument board of the vehicle, or a bracket of desired shape which may be secured in any suitable manner to a desired part of the vehicle. The plates 10 and 11 have semi-circular notches 21 which allow ample clearance for the screws 19, even though they are considerably longer than necessary.

The cover 14 is provided with a slot 22, in one side, through which the operating handle 23 projects and the ends of this slot may act as limiting stops for the movement of the handle 23 in either direction. The handle is pivoted on a shouldered screw 24, threaded at 25 into the plate 10. A spring washer 26 interposed between the handle and disk 10 aids to insure the handle being maintained in its proper position and prevents the screw 24 loosening from vibration. Means are provided for returning the handle to the neutral or off position, as particularly shown in full lines in Figure 4, and for maintaining the handle in this position. This means comprises a U-shaped spring 27 located in the chamber 28, formed between the top plate 10 and the closed end of the cover 14. The spring 27 is secured by rivets or other means 29 to the cover 14, and has arms 30 and 31, bent inwardly, or toward each other, at their free ends 32 and 33 which are engaged by a lug 34 projecting from the closed end wall of the cover. A boss 35 formed on a tail piece 36 of the handle 23 rests between the ends 32 and 33 of the arms 30 and 31, and the handle is thus prevented from movement until sufficient pressure is applied thereto to flex one of the arms 30 or 31, depending upon the direction in which the handle is moved. When the handle 23 is in the full line position of Figure 1, the directional signals, or other equipment the valve controls, is not in operation. When the handle is swung to the position indicated by the line a of Figure 4, or the position indicated in Figure 7, one set of apparatus is caused to function by mechanism hereinafter described. When the handle is moved to the position indicated by the line b of Figure 4, another set of apparatus is operated by mechanism hereinafter described. Means are provided for maintaining the handle in either position a or b until it is desired to manually release it.

Slidably mounted in the boss 35 is a detent, the head 37 (Figure 5) of which is normally pressed outwardly against the surface of the plate 10 by a spring 38. Depressions 39 and 40, Figures 4, 6 and 7, are formed in the plate 10 to receive the detent 37. When the handle is in position a, the member 37 will engage the depression 40, and when it is in position b the member will engage depression 39, thus holding the handle in either one of the two extreme positions. When it is desired to return the handle to the normal position, it is only necessary to exert sufficient pressure to unseat the detent 37 and one of the arms 30 or 31, depending upon the position of the valve, will return the handle to the normal or off position. If desired, the spring 27 might be omitted and manual pressure used to return the valve handle to normal position where it would be held by the member 37 pressing against the surface of the plate 10.

As heretofore stated, the invention relates particularly to controlling vacuum operated directional signals. Means are provided for connecting the valve to a source of vacuum and for distributing this vacuum pressure, when desired, to either one of the two signals. A tube 41 is connected to the plate 12 and a hose or other medium, not shown, may connect this tube to a source of vacuum, such for instance as the intake manifold of the vehicle engine, or an independent vacuum tank. The tube 41 communicates with a groove 42 on the plate 11, as shown in full lines in Figure 5, and in broken lines in Figure 8. The groove 42 communicates with a U-shaped groove or passage 43 formed in the plate 12. Secured by a rivet or other means 44, in the U-shaped groove 43, is a U-shaped spring 45. The legs 46 and 47 of this spring engage spindles 48 an 49, respectively. The spindles pass through clearance holes 50 in the plate 11. The holes 50 lead into annular chambers 51, one-half of which is formed in the plate 11 and the other half in the plate 10. The portions of the spindles in the chambers 51 are provided with flanges 52 upon opposite sides of which are secured oil-proof rubber facings 53. Valve seats 54 are formed on one side of the chambers 51, and as shown in Figures 3 and 6 one set of the facings 53 is in engagement with the valve seats 54. It will thus be apparent that the vacuum pressure supplied through the tube 41, groove 42 and passage 43 will be shut off by the facings 53 cooperating with the valve seats 54. When either one of the spindles 48 or 49 is pressed upwardly by one of the legs 46 or 47 of the U-shaped spring 45, effects of vacuum are transmitted to one of the chambers 51. Communicating with the chambers 51 are grooves 55 and 56 formed in the plate 10, Figures 6 and 7. The grooves 55 and 56 communicate with pipes 57 and 58, Figures 3 and 8, which in turn are connected by any suitable means to the directional signals, or other equipment, to be controlled by the valve.

Means are provided for maintaining the facings 53 against the seats 54, when the handle is in the normal or off position. The other ends of the spindles 48 and 49 pass through clearance holes 59 leading from the chambers 51, and said chambers are provided with valve seats 60 which cooperate with the facings 53 when the spindles are shifted in that direction. The clearance holes 59 act as escapes, for eliminating the effects of vacuum to atmosphere, when the handle 23 has been moved to its normal or off position, and act reversely when the other facings 53 have been moved away from the valve seats 54. Secured to the handle 23, by rivets or other means 61, is a spring 62, which is substantially circular, as shown in Figure 4, and the extremities 63 of which are in a plane slightly apart from the surface of the plate 10, and normally rest upon the ends of the spindles 48 and 49. Offset or sloped portions 64 extend from ends 63 and merge into high portion 65, which is riveted to the handle 23, as stated. In order to insure airtight joints between the plates 10, 11 and 12, and to compensate for any slight irregularities that might occur in the disks, gaskets 66, made of paper or other thin material, may be interposed between said disks.

It is believed that the operation of my controller can be understood from the foregoing; but, the following brief statement will be added:

When the valve handle 23 is moved from the normal, or off position of Figures 3, 4, 5 and 6, to the broken line position a of Figure 4, or to the full line position of Figure 7, the arm 31 of the spring 27 will be flexed and the detent 37 will enter the depression 40. The spindle 48, due to being under one of the offset portions 64, will be shifted by the leg 46 of the U-shaped spring 45. Effects of vacuum will then be felt in the chambers 51, and thence through passage 55, and tube 57 to the directional signal to be operated. After the handle has been returned to normal, or off position, the facing 53 will be moved away from the valve seat 60, and the effects of vacuum in the signal will be dissipated to atmosphere to allow the signal to return to its inoperative position. When the handle is moved to the position b of Figure 4, the opposite signal will be operated in a similar manner. In either operative position of the handle, the signal will remain in condition of visibility until the handle is tapped lightly to overcome the detent 37, whereupon the handle will automatically return to neutral position.

In the foregoing I have indicated that the supporting means 20 may be given any desired form to enable the controller to be applied to any convenient portion of the vehicle in position for operation by the driver; that is to say, the plate 20 can be so formed as to enable the controller to be secured to a bracket on the inside of the car adjacent the instrument board, or it can be so formed as to cooperate with means for securing the controller to either the steering post or the steering wheel of an automobile, truck or bus. If the controller is applied to the instrument board, the latter will be suitably bored to receive the tubular members 41, 57 and 58, and screws 19 so that said tubular members can be passed through the apertures in the instrument board and the said screws into the lugs 18. Regardless of how the device is supported, the instrument board 20 or mounting bracket will have the additional function of keeping the controller clean by operating as a dust guard to prevent grit, dirt, dust and other particles from sifting into the casing 14.

Having thus described my invention, what I claim and desire to secure by Letters Patent is:

1. A controller for directional signals comprising an enclosing casing, a plurality of plates secured together in parallel relation and provided with conduits between them, a lever pivotally mounted approximately centrally of the casing, means between the lever and one of the plates creating a detent for holding the lever in a predetermined position, and means communicating with said conduits whereby to control the operation of signals.

2. A controller for directional signals comprising a cup-shaped frame, a plurality of plates mounted in said frame, a lever pivoted to one of the plates, yielding means within the frame for controlling the operation of the lever, means between the yielding means and lever for cooperative action, and a detent carried by the lever for engaging one of the plates for holding the lever in predetermined position.

3. A controller for directional signals comprising a cup-shaped frame having a slot in one side thereof, a plurality of plates mounted in said frame, a pivotally mounted lever projecting through the slot and adapted to operate therein, said plates containing a plurality of conduits, yieldingly mounted valves within the conduits, seats provided by the plates for cooperation with the valves, and means carried by the lever for actuating the valves to control the freedom of the conduits.

4. A controller for directional signals having mounted therein a plurality of parallel contiguous plates, sealing means between the plates, a lever mounted on one of the plates, a detent mechanism between the lever and one of the plates, conduits formed in the plates, and means adapted to interact with the conduits for transmitting the effects of vacuum, said interacting means including the lever whereby the effects of vacuum may be transmitted from the controller to functional devices.

5. A controller for directional signals comprising a casing, a plurality of plates secured together within said casing and provided with a plurality of valved conduits, means communicating with the conduits for transmitting the effects of vacuum, controlling means within the casing for shifting the valves and including devices for controlling the action of the shifting means.

6. A controller for directional signals comprising an enclosing casing, a plurality of plates secured together in parallel relation and provided with conduits between them, a lever pivotally mounted within the casing, yielding means within the casing interacting with the lever for controlling the operation of the latter, and one of the plates being of a size to act as a closure for the open side of the casing.

7. A controller for directional signals comprising an enclosing casing, a plurality of plates secured together in parallel relation and provided with conduits between them, a controlling lever pivotally mounted within the casing and carrying a plurality of cams, valves within the conduits interacting with said cams, and means interacting with the conduits for transmitting the effects of vacuum.

JOHN W. HAYWOOD.